US012669723B2

(12) United States Patent
Chen et al.

(10) Patent No.: US 12,669,723 B2
(45) Date of Patent: Jun. 30, 2026

(54) EMBEDDED RADIO FREQUENCY SHIELD BETWEEN INTEGRATED OPTICAL MODULATOR AND SILICON SUBSTRATE

(71) Applicant: Cisco Technology, Inc., San Jose, CA (US)

(72) Inventors: Long Chen, Marlboro, NJ (US); Qianfan Xu, San Jose, CA (US); Li Chen, Marlboro, NJ (US); Mark A. Webster, Bethlehem, PA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 587 days.

(21) Appl. No.: 18/155,300

(22) Filed: Jan. 17, 2023

(65) Prior Publication Data

US 2024/0241332 A1 Jul. 18, 2024

(51) Int. Cl.
| | |
|---|---|
| *G02F 1/035* | (2006.01) |
| *G02B 6/12* | (2006.01) |
| *G02B 6/13* | (2006.01) |
| *G02F 1/025* | (2006.01) |
| *G02F 1/225* | (2006.01) |

(52) U.S. Cl.
CPC ............. *G02F 1/0356* (2013.01); *G02B 6/13* (2013.01); *G02F 1/025* (2013.01); *G02B 2006/12142* (2013.01); *G02F 1/2255* (2013.01); *G02F 1/2257* (2013.01); *G02F 2201/127* (2013.01); *G02F 2201/501* (2013.01)

(58) Field of Classification Search
CPC .... G02B 6/4277; G02B 6/12004; G02B 6/13;

G02B 2006/12142; G02F 1/025; G02F 1/0356; G02F 1/2255; G02F 1/2257; G02F 2201/127; G02F 2201/501

See application file for complete search history.

(56) References Cited

U.S. PATENT DOCUMENTS

| | | | |
|---|---|---|---|
| 9,640,531 B1 | 5/2017 | Or-Bach et al. | |
| 9,726,840 B2 | 8/2017 | Chen | |
| 9,939,666 B2 | 4/2018 | Chen | |
| 10,133,142 B2 | 11/2018 | Doerr et al. | |
| 2017/0139132 A1* | 5/2017 | Patel | G02B 6/4206 |
| 2017/0365563 A1* | 12/2017 | Chen | H01L 23/66 |
| 2018/0173026 A1* | 6/2018 | Kissa | G02F 1/2255 |
| 2020/0012163 A1 | 1/2020 | Yan et al. | |

(Continued)

FOREIGN PATENT DOCUMENTS

WO 2022040063 A1 2/2022

OTHER PUBLICATIONS

Extended European Search Report for counterpart European Patent Application No. 24152309.1, mailed Jun. 14, 2024, 12 pages.

(Continued)

*Primary Examiner* — Michelle R Connelly
(74) *Attorney, Agent, or Firm* — Edell, Shapiro & Finnan, LLC

(57) ABSTRACT

A device and a method of fabricating the device are provided. The device includes an optical modulator formed in a dielectric material, a silicon substrate adjacent the dielectric material, and a metal shield formed in the dielectric material between the optical modulator and the silicon substrate. The metal shield blocks an electromagnetic field of a driving signal of the optical modulator from extending into the silicon substrate.

20 Claims, 15 Drawing Sheets

(56)  References Cited

U.S. PATENT DOCUMENTS

| | | |
|---|---|---|
| 2021/0055581 A1 | 2/2021 | Yan et al. |
| 2021/0067123 A1 | 3/2021 | Shealy et al. |
| 2021/0165299 A1 | 6/2021 | Motoya et al. |
| 2021/0286203 A1 | 9/2021 | Safian |
| 2022/0052763 A1 | 2/2022 | Chen et al. |

OTHER PUBLICATIONS

Ma Y., et al., "Artificial Dielectric Shields for Integrated Transmission Lines", IEEE Microwave and Wireless Components Letters, IEEE Service Center, New York, NY, US, vol. 18, No. 7, XP011227658, ISSN: 1531-1309, DOI: 10.1109/LMWC.2008.924907, Jul. 2008, pp. 431-433.

* cited by examiner

FLOATING SHIELD PLANE

CONNECTED SHIELD PLANE

FLOATING SHIELD PLANE

CONNECTED SHIELD PLANE

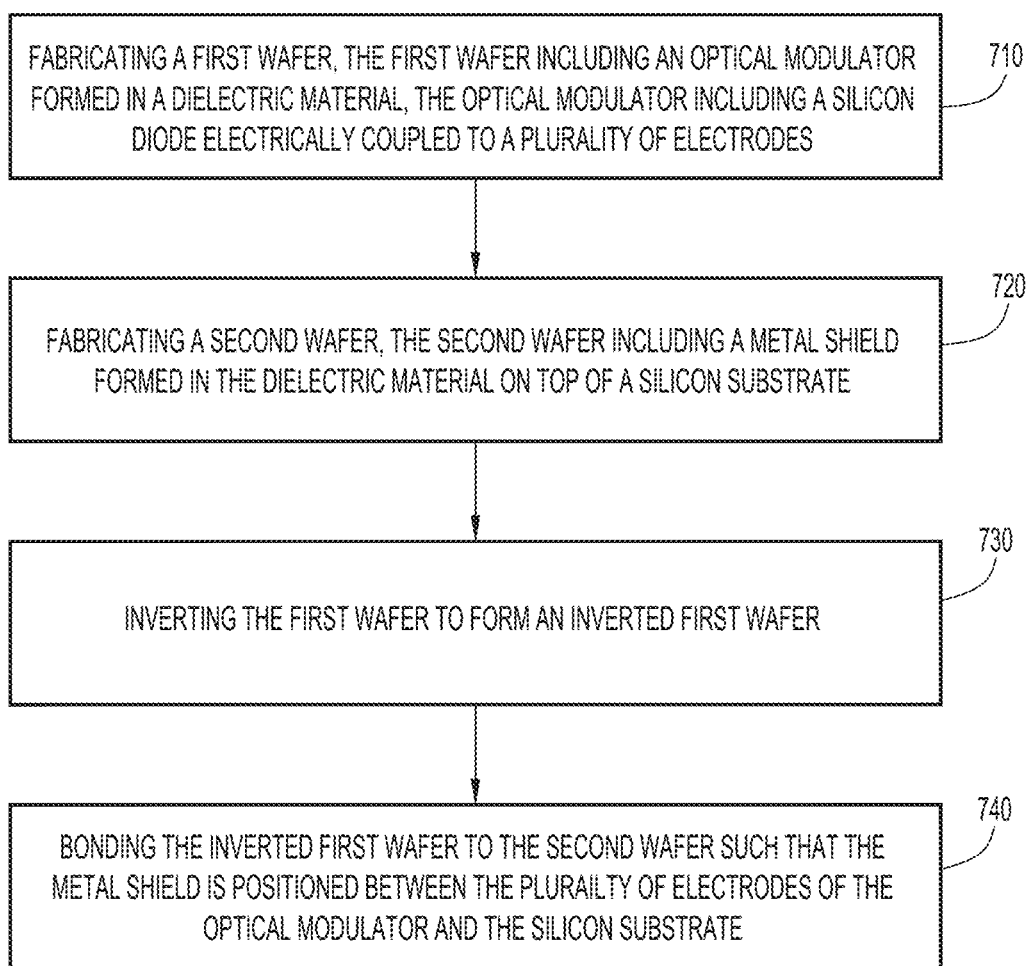

700

FABRICATING A FIRST WAFER, THE FIRST WAFER INCLUDING AN OPTICAL MODULATOR FORMED IN A DIELECTRIC MATERIAL, THE OPTICAL MODULATOR INCLUDING A SILICON DIODE ELECTRICALLY COUPLED TO A PLURALITY OF ELECTRODES    710

FABRICATING A SECOND WAFER, THE SECOND WAFER INCLUDING A METAL SHIELD FORMED IN THE DIELECTRIC MATERIAL ON TOP OF A SILICON SUBSTRATE    720

INVERTING THE FIRST WAFER TO FORM AN INVERTED FIRST WAFER    730

BONDING THE INVERTED FIRST WAFER TO THE SECOND WAFER SUCH THAT THE METAL SHIELD IS POSITIONED BETWEEN THE PLURAILTY OF ELECTRODES OF THE OPTICAL MODULATOR AND THE SILICON SUBSTRATE    740

FIG.7

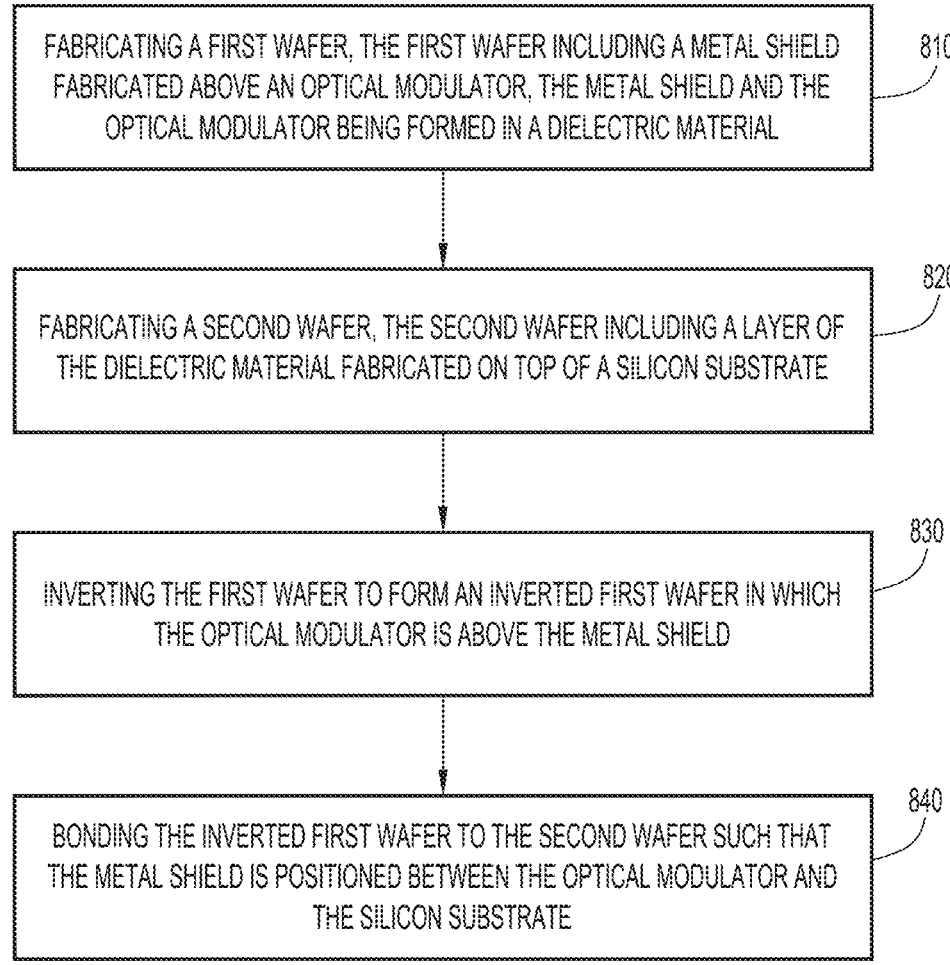

800

FABRICATING A FIRST WAFER, THE FIRST WAFER INCLUDING A METAL SHIELD FABRICATED ABOVE AN OPTICAL MODULATOR, THE METAL SHIELD AND THE OPTICAL MODULATOR BEING FORMED IN A DIELECTRIC MATERIAL    810

FABRICATING A SECOND WAFER, THE SECOND WAFER INCLUDING A LAYER OF THE DIELECTRIC MATERIAL FABRICATED ON TOP OF A SILICON SUBSTRATE    820

INVERTING THE FIRST WAFER TO FORM AN INVERTED FIRST WAFER IN WHICH THE OPTICAL MODULATOR IS ABOVE THE METAL SHIELD    830

BONDING THE INVERTED FIRST WAFER TO THE SECOND WAFER SUCH THAT THE METAL SHIELD IS POSITIONED BETWEEN THE OPTICAL MODULATOR AND THE SILICON SUBSTRATE    840

FIG.8

EMBEDDED RADIO FREQUENCY SHIELD BETWEEN INTEGRATED OPTICAL MODULATOR AND SILICON SUBSTRATE

TECHNICAL FIELD

The present disclosure relates to an embedded radio frequency (RF) shield between an integrated silicon modulator and a silicon substrate.

BACKGROUND

High speed silicon photonics often use relatively long traveling-wave modulators placed over silicon handle substrates and separated by dielectrics. Electromagnetic fields from RF signals propagating along electrodes of the traveling-wave modulators can partially extend into the silicon substrates. If the silicon substrates are partially conducting, the electromagnetic fields can induce displacement current inside the silicon substrate and the silicon substrate induces undesired absorption loss into the RF driving signal.

BRIEF DESCRIPTION OF THE DRAWINGS

FIG. 7 is a flow diagram illustrating a method of fabricating a semiconductor device in which a metal shield is placed between a modulator and a substrate, according to an example embodiment.

FIG. 8 is a flow diagram illustrating another method of fabricating a semiconductor device in which a metal shield is placed between a modulator and a substrate, according to an example embodiment.

DETAILED DESCRIPTION

Overview

Figure 1:
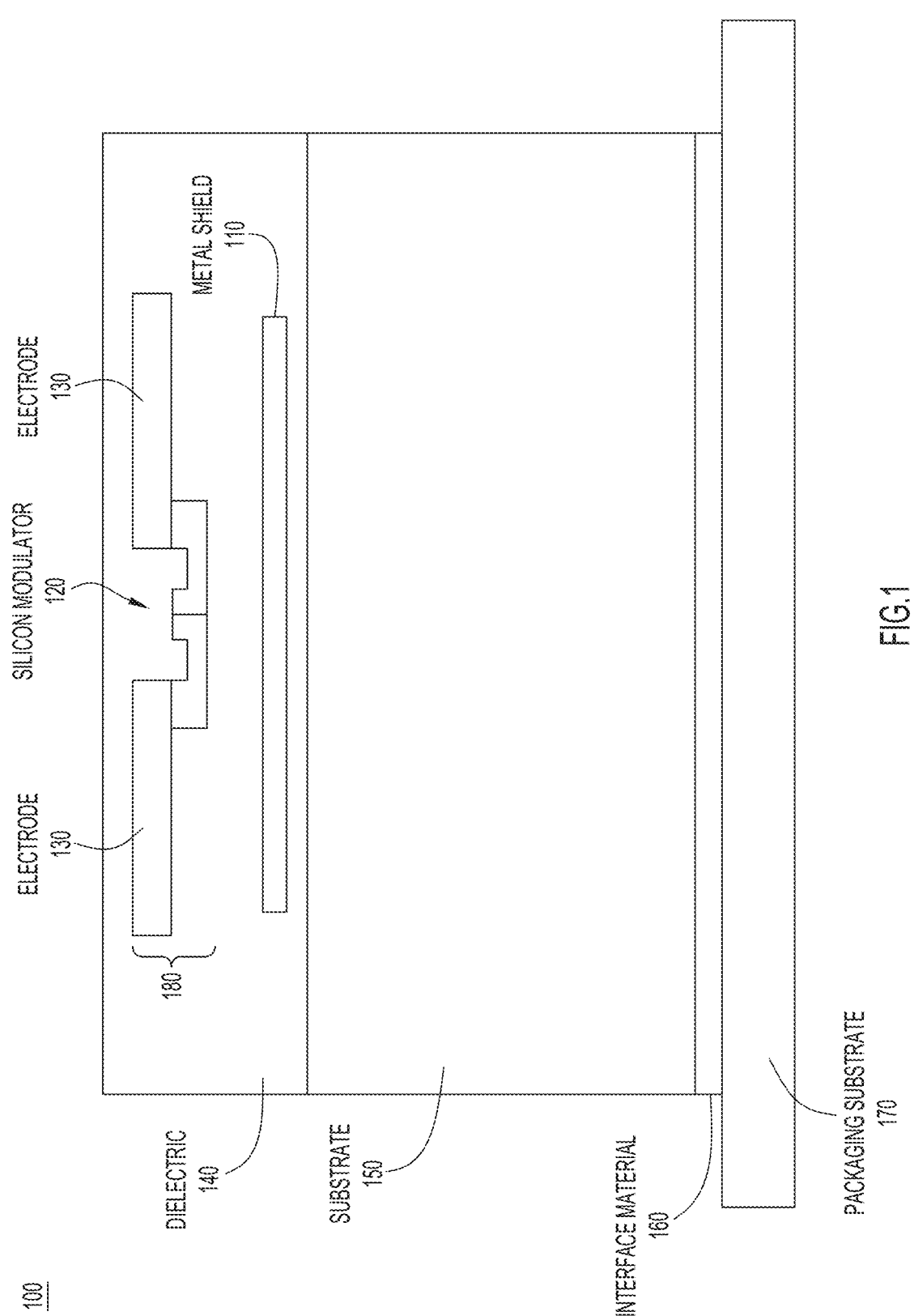
FIG. 1 is a diagram of a semiconductor device in which a metal shield is placed between a modulator and a substrate, according to an example embodiment.

In one embodiment, a device is provided that includes a metal shield to block an electromagnetic field from an optical modulator from extending into a substrate. The device includes an optical modulator formed in a dielectric material; a silicon substrate adjacent the dielectric material; and a metal shield formed in the dielectric material between the optical modulator and the silicon substrate, the metal shield blocking an electromagnetic field of a driving signal of the optical modulator from extending into the silicon substrate.

In another embodiment, a method is provided for fabricating the device. The method includes fabricating a first wafer, the first wafer including an optical modulator formed in a dielectric material, the optical modulator including a silicon diode electrically coupled to a plurality of electrodes; fabricating a second wafer, the second wafer including a metal shield formed in the dielectric material on top of a silicon substrate; inverting the first wafer to form an inverted first wafer; and bonding the inverted first wafer to the second wafer such that the metal shield is positioned between the plurality of electrodes of the optical modulator and the silicon substrate.

In yet another embodiment, another method is provided for fabricating the device. The method includes fabricating a first wafer, the first wafer including a metal shield fabricated above an optical modulator, the metal shield and the optical modulator being formed in a dielectric material; fabricating a second wafer, the second wafer including a layer of the dielectric material fabricated on top of a silicon substrate; inverting the first wafer to form an inverted first wafer in which the optical modulator is above the metal shield; and bonding the inverted first wafer to the second wafer such that the metal shield is positioned between the optical modulator and the silicon substrate.

Example Embodiments

High speed traveling-wave optical modulators include one or two silicon waveguides containing one or multiple electrical junctions (such as pn diodes or metal-oxide-semiconductor (MOS) capacitors) embedded or formed in dielectric materials and a set of electrodes co-propagating with the waveguides and providing RF driving signals. The waveguides and electrodes are both placed over a silicon handle substrate and are separated from the silicon handle substrate by dielectrics. The separation between the waveguides and electrodes is typically several micrometers. This separation is sufficient for optical isolation thanks to the strong confinement of the optical waveguides. However, for the RF signal propagating along the electrodes, the electromagnetic field caused by the RF signal propagation partially extends into the silicon substrate. If the silicon substrate is partially conducting (e.g., with a resistivity between 0.1 ohm-centimeters (cm) and 100 ohm-cm), the electromagnetic field induces displacement current inside the substrate. In addition, the resistive substrate induces undesired absorption loss into the RF driving signal.

One solution to avoid the undesired RF absorption loss induced by the silicon substrate is to use high-resistivity silicon substrates (e.g., with a resistivity of 750 ohm-cm). Using a high-resistivity silicon substrate poses two possible problems. First, a high-resistivity substrate may become a limitation in wafer availability or foundry fabrication processes (such as through silicon via processes). Second, while the high-resistivity substrate avoids RF absorption loss of the driving signals of the modulators, RF crosstalk between one integrated circuit to another integrated circuit on the same silicon substrate is significantly degraded, particularly with regard to long-range crosstalk. This is because radiated electromagnetic energy is freely propagating inside the substrate without any damping, from one circuit to another even if the two circuits are separated by more than 2 millimeters. Such long-range RF crosstalk is particularly problematic from an output of a driver circuit to the input of a trans-impedance-amplifier (TIA) circuit because of the large gain of the driver and TIA. In many cases, even a crosstalk level of −70 decibels between driver output to TIA input would induce notable penalty in receiver sensitivity.

Another solution is to engineer silicon substrates to have two types of resistivity—high resistivity in the immediate area near the traveling-wave modulator and a low resistivity in other regions. However, this solution requires complex fabrication cycles in the silicon substrate.

Embodiments described herein provide for inserting one or more metal layers between the optical modulator and the silicon substrates as an RF shield. The metal shield stops the electromagnetic field of the driving signal from reaching the silicon substrate and may reduce or eliminate the substrate RF absorption loss over a wide range of silicon substrate resistivities (e.g., from 0.1 ohm-cm and >1000 ohm-cm). In addition, the metal shield allows the use of a low resistivity substrate (e.g., between 1 ohm-cm and 20 ohm-cm), when the RF absorption loss can be very high outside the RF shield region, which can be used to considerably suppress the long-range RF crosstalk from one circuit to another circuit on the same substrate. RF simulation shows that the long-range RF crosstalk can be suppressed by more than 10 decibels with proper design parameters compared with high-resistivity substrates.

In some embodiments, the RF shield is comprised of solid metal blocks underneath the electrodes/modulators. In other embodiments, the RF shield is patterned so that the metal is only partially present. For example, the RF shield may consist of many narrow metal bars placed in the transverse direction of the electrode propagation with the certain pitch. Patterning the metal shield in this manner allows another degree of freedom where the parasitic capacitance from the RF shield can be used to optimize the modulator characteristics (e.g., impedance, velocity, bandwidth). Patterning the metal shield into discrete bars may provide RF shielding by terminating the RF field lines without carrying current along the transmission line. Therefore, the extra RF loss typically associated with, for example, a solid ground shield is mitigated/eliminated. Although it is desirable to completely isolate the electromagnetic field from the substrate, it is recognized that when patterned metal bars are used and the metal bars are close to the substrate, the RF field may still partially reach the substrate. In this case, the RF loss may be partially reduced, while not completely eliminated.

Presented herein are techniques for fabricating the metal shield between the optical modulator and the silicon substrate by using wafer bonding. In one embodiment, a wafer including the optical modulator and the metal shield formed in a dielectric material is inverted and bonded to a handle wafer including the dielectric material and a silicon substrate. In another embodiment, a wafer including an optical modulator formed in a dielectric material is inverted and bonded to a handle wafer including a metal shield embedded or formed in the dielectric material on top of a silicon wafer.

Reference is first made to FIG. 1. FIG. 1 shows a diagram of a semiconductor device 100 in which a metal layer is placed between a modulator and a silicon substrate. Semiconductor device 100 includes a modulator 180, a metal shield 110, a substrate 150, an interface material 160, and a packaging substrate 170. The metal shield 110 and the modulator are embedded/formed in a dielectric 140 (also referred to herein as a dielectric material).

Modulator 180 may be a traveling-wave/optical modulator that may be used in silicon photonic transceivers for high-speed optical interconnects. As illustrated in FIG. 1, modulator 180 includes electrodes 130 and a silicon diode or silicon modulator 120. In some embodiments, modulator 180 and/or silicon modulator 120 may include a combination of a silicon layer and another layer (e.g., a layer of lithium niobate). Although only one modulator 180 with two electrodes 130 and one silicon modulator 120 is illustrated, a plurality of modulators 180 with different designs of diodes may be included in the semiconductor device 100. For example, in some embodiments, semiconductor device 100 may include two silicon diodes driven by a set of electrodes in a differential manner. In some embodiments, semiconductor device 100 may include multiple copies of such modulator. Silicon modulator 120 may additionally be referred to herein as a silicon waveguide or a waveguide. The set of electrodes 130 co-propagating with the silicon modulator 120 provide RF driving signals that produce an electromagnetic field that emanates from the modulator 180. Modulator 180 is formed in a layer of the dielectric 140. The dielectric 140 may include one or more dielectric materials such as silicon dioxide, silicon nitride, etc.

Semiconductor device 100 includes a metal shield 110 formed/embedded in the dielectric 140. Metal shield 110 may be referred to herein as an RF shield, a metal layer, or a metal shield layer. Metal shield 110 may block the electromagnetic field of the modulator 180 from reaching substrate 150. Substrate 150 may include a silicon substrate. In some embodiments, substrate 150 may be a low resistivity silicon substrate. Embedding metal shield 110 between modulator 180 and substrate 150 allows the use of a low resistivity substrate without degrading the performance of modulator 180 and, at the same time, significantly improving the RF crosstalk between transmitter and receiver circuits. Using the low resistivity substrate allows for regions where low RF losses are desired to be shielded with the metal while leaving other regions without shielding to attenuate stray fields and reduce RF crosstalk. Away from transmission lines, particular in power/ground planes, the use of a low resistivity silicon substrate 150 maximizes damping and suppression of RF crosstalk.

In some embodiments, the metal shield 110 may be a solid metal layer or a series of solid metal blocks underneath modulator 180. In some embodiments, metal shield 110 may be patterned. For example, under transmission lines, a pattern may be added to metal shield 110 to insulate the electromagnetic field from substrate 150 to avoid extra RF loss. In some embodiments, metal shield 110 may be patterned with slots or patterned into connected or isolated bars across the differential electrodes 130 at various intervals. Patterning the metal shield 110 into discrete bars provides RF shielding by terminating the RF shield lines without carrying current along the transmission line (and, therefore, without suffering the extra RF loss typically associated with, for example, a solid metal shield).

In some embodiments, metal shield 110 may be floating and not connected to any other electrodes. In other embodiments, metal shield may be electrically coupled to other metals or electrodes.

Substrate 150 may be coupled to packaging substrate 170 with interface material 160. Packaging substrate 170 may protect semiconductor device 100 from an outside environment and may allow electrical connection to the elements in the semiconductor device 100.

Reference is now made to FIGS. 2A-2E. FIGS. 2A-2E illustrate a method of fabricating a semiconductor device with a metal shield between an optical modulator and a substrate. FIGS. 2A-2E illustrate fabricating the semiconductor device using a wafer bonding configuration, which enables a metal layer (e.g., a ground plane for an RF transmission line) to be placed between a silicon/optical modulator and a silicon substrate.

Figure 2A:
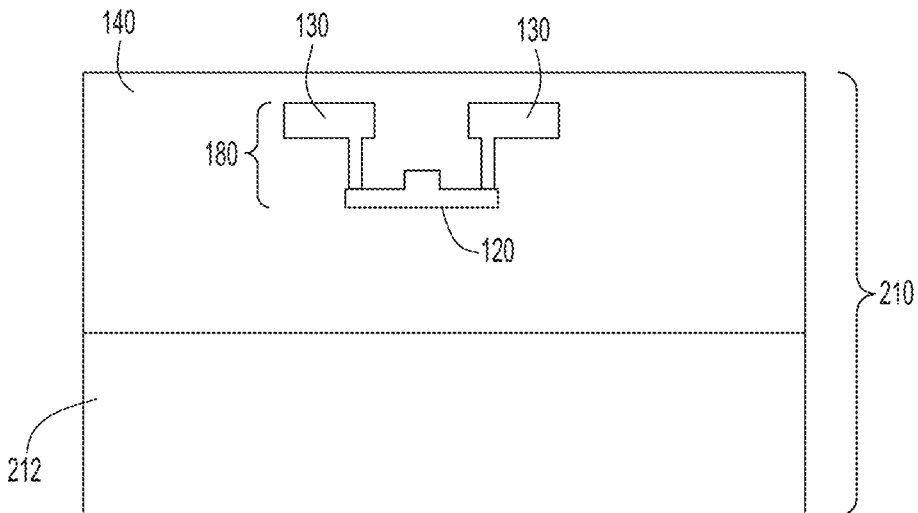
FIGS. 2A-2E are diagrams illustrating an exemplary method of fabricating a semiconductor device in which a metal shield is placed between a modulator and a substrate, according to an example embodiment.

FIG. 2A illustrates a wafer 210 that includes a layer of a dielectric 140 on top of a substrate 212. Modulator 180 (including silicon modulator 120 and electrodes 130) is formed/embedded in the dielectric 140. Wafer 210 is fabricated so that the substrate 212 is on the bottom layer and the dielectric 140 is above and adjacent the substrate 212. Electrodes 130 are above of and electrically coupled to silicon modulator 120.

Figure 2B:
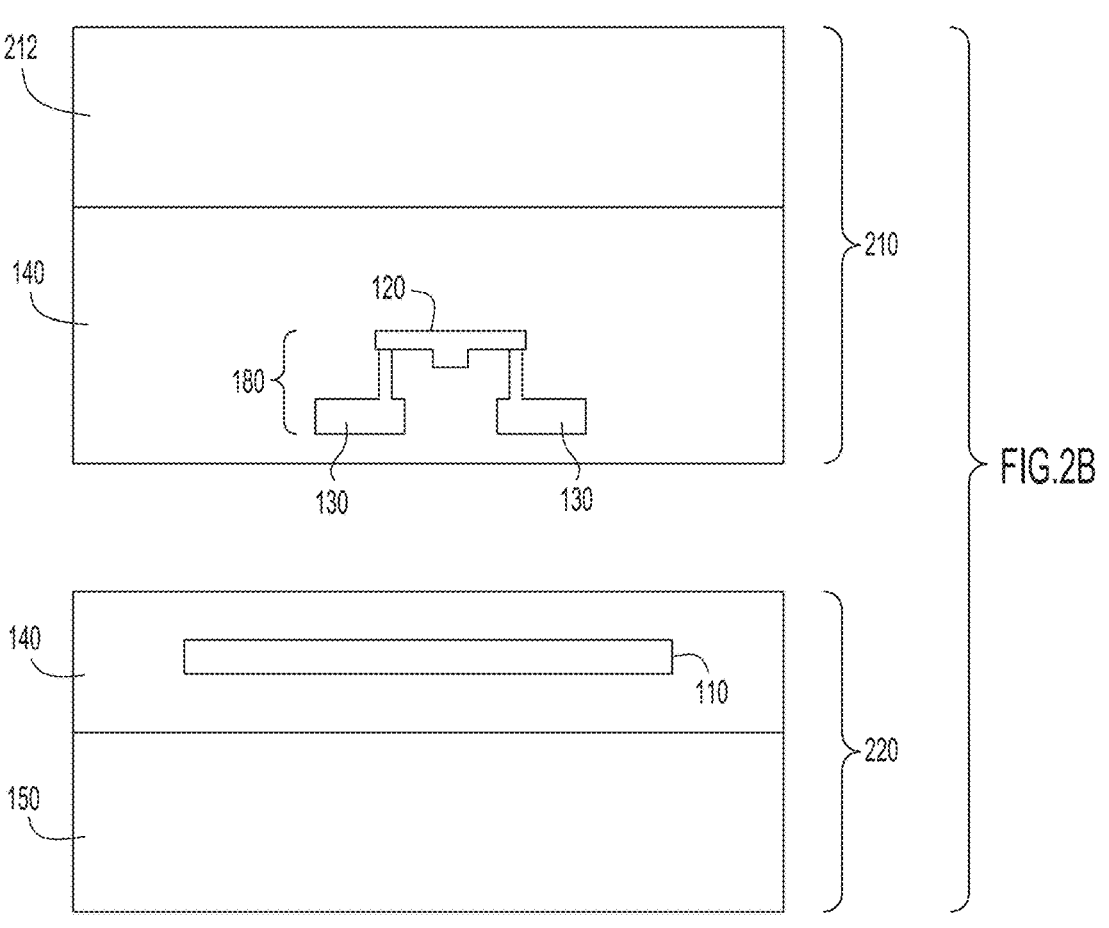

FIG. 2B illustrates a handle wafer 220 that includes a layer of dielectric 140 fabricated on top of substrate 150. Metal shield 110 is formed/embedded in the dielectric 140 in handle wafer 220. FIG. 2B illustrates that wafer 210 has been turned upside down or inverted and placed on top of handle wafer 220 so that the dielectric 140 of wafer 210 is face-to-face with the dielectric 140 of handle wafer 220. Inverted wafer 210 has substrate 212 above dielectric 140. In addition, in inverted wafer 210, modulator 180 has been inverted so that silicon modulator 120 is above and electrically coupled to electrodes 130.

Figure 2C:
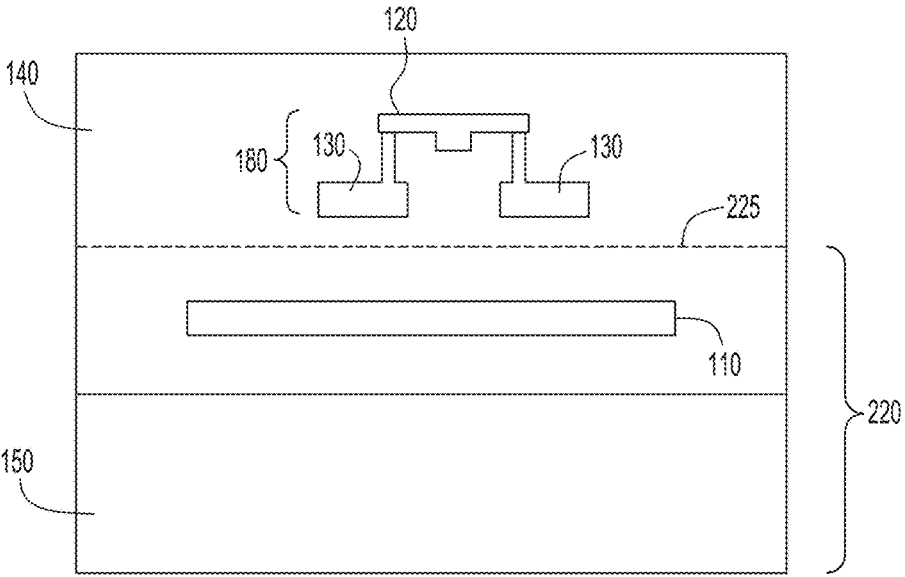
Figure 2D:
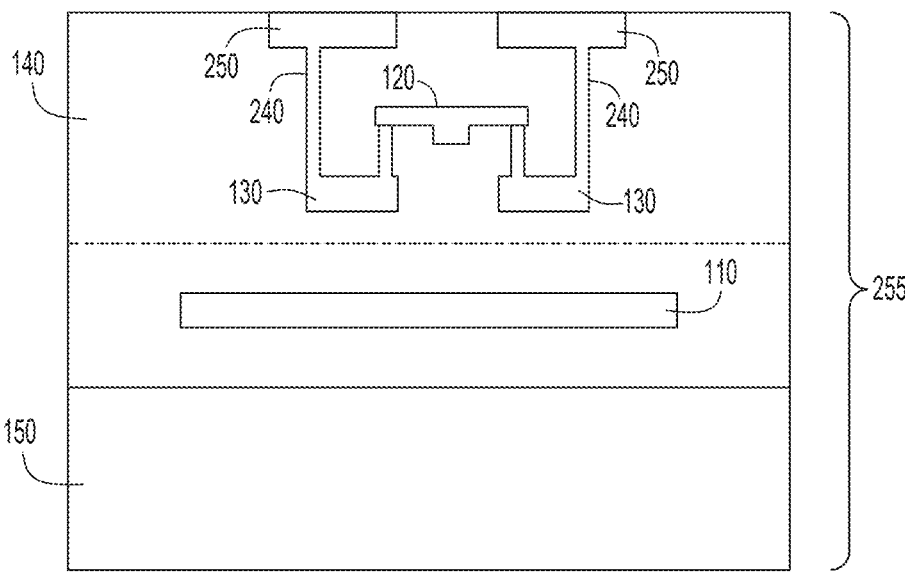

In FIG. 2C, inverted wafer 210 has been bonded to handle wafer 220 and the substrate 212 of wafer 210 has been removed. As illustrated in FIG. 2C, the dielectric 140 of inverted wafer 210 has been bonded with the dielectric 140 of handle wafer 220 at wafer bonding interface 225. Metal shield 110 is between the electrodes 130 of modulator 180 and substrate 150. Because the metal shield 110 was fabricated in handle wafer 220, metal shield 110 is below wafer bonding interface 225. FIG. 2D illustrates an example of a semiconductor device 255 in which metal shield 110 is a floating shielding plane. In FIG. 2D, electrodes 130 are electrically connected to metals/electrodes 250 with vias 240. In the example illustrated in FIG. 2D, metal shield 110 is floating or not connected to any metals or electrodes. Metal shield 110 blocks the electromagnetic field from electrodes 130 from reaching substrate 150. In some embodiments, electrodes that provide the RF driving signals for modulator 180 may be one or more of electrodes 130 and/or metals/electrodes 250.

Figure 2E:
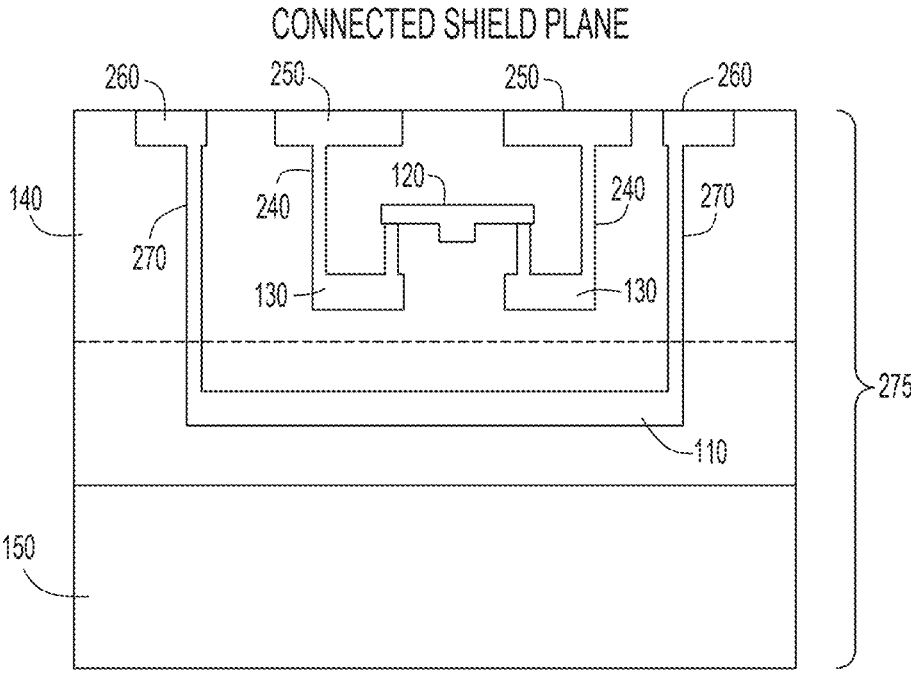

FIG. 2E is an example of a semiconductor device 275 in which the metal shield 110 is connected to metals or electrodes. As illustrated in FIG. 2E, electrodes 130 are electrically connected to metals/electrodes 250 with vias 240. In addition, metal shield 110 is electrically coupled to metals/electrodes 260 with vias 270 to form a connected shielding plane. Metal shield 110 blocks the electromagnetic field emanating from electrodes 130 from reaching substrate 150. In some embodiments, a wall of via 270 may reduce the RF crosstalk between adjacent modulators. Vias 270 may be continuous vias or individual periodic vias along the length of the modulator.

FIGS. 2D and 2E illustrate alternate embodiments in which the metal shield 110 can be implemented. Here the illustration of metal interconnects with electrodes 130, metal shield 110, metals/electrodes 250, vias 240, metals/electrodes 260, and via 270 are for simplicity only. In some embodiments, there could be other metal layers that assist in the interconnects between electrodes and the modulator and between electrodes and the metal shield. In some embodiments, the metals/electrodes 250 and metals/electrodes 260 may be at different planes or connected to additional metal layers at different planes.

Reference is now made to FIGS. 3A-3E. FIGS. 3A-3E illustrate another method of fabricating a semiconductor device with a metal shield between an optical modulator and a substrate. FIGS. 3A-3E illustrate fabricating the semiconductor device using another wafer bonding configuration that enables a metal layer (e.g., a ground plane for an RF transmission line) to be placed between a silicon/optical modulator and a silicon substrate.

Figure 3A:
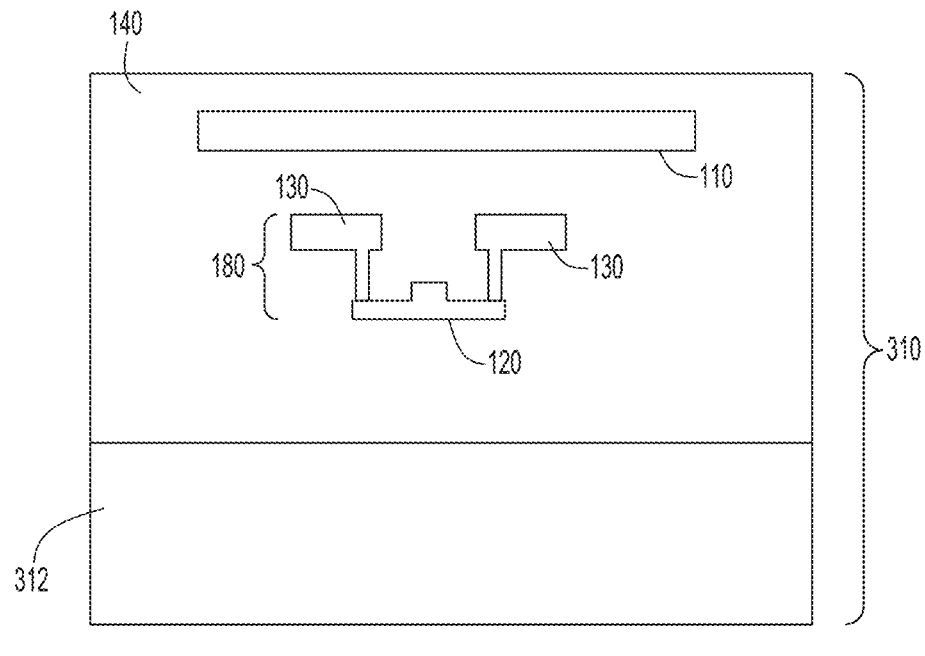
FIGS. 3A-3E are diagrams illustrating another exemplary method of fabricating a semiconductor device in which a metal shield is placed between a modulator and a substrate, according to an example embodiment.

FIG. 3A illustrates a wafer 310 that includes a layer of a dielectric 140 on top of a substrate 312. Modulator 180 (including silicon modulator 120 and electrodes 130) and metal shield 110 are formed/embedded in the dielectric 140. Wafer 310 is fabricated so that the substrate 312 is the bottom layer and the dielectric 140 is above the substrate 312. Electrodes 130 are above and electrically coupled to silicon modulator 120 in the dielectric 140 and the metal shield 110 is fabricated above and spaced apart from the modulator 180 in the dielectric 140.

Figure 3B:
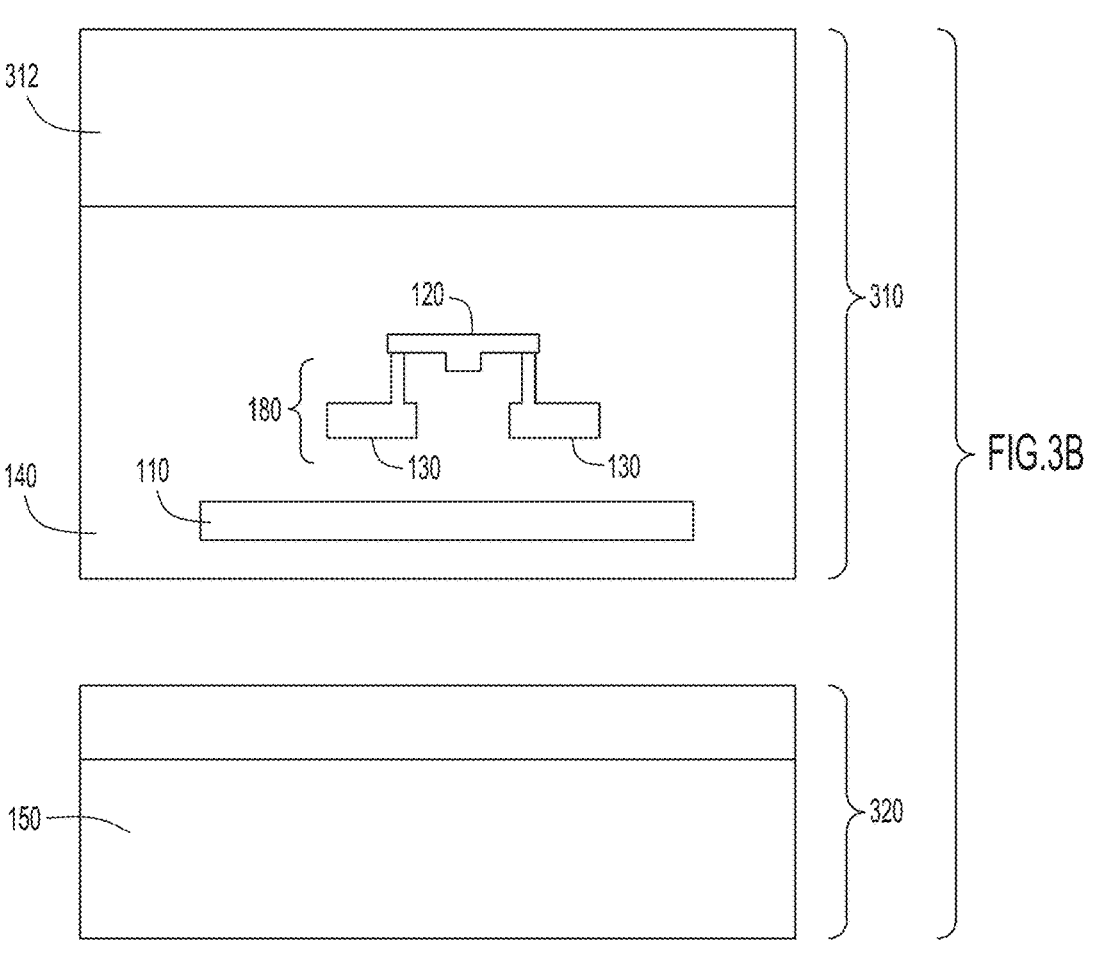

FIG. 3B illustrates a handle wafer 320 that includes a layer of dielectric 140 fabricated on top of substrate 150. FIG. 3B illustrates that wafer 310 has been turned upside down or inverted and placed on top of handle wafer 320 so that the dielectric 140 of wafer 310 is face-to-face with the dielectric 140 of handle wafer 320. Inverted wafer 310 has substrate 312 above dielectric 140. In addition, in inverted wafer 310, modulator 180 has been inverted so that silicon modulator 120 is above and electrically coupled to electrodes 130 and metal shield 110 is below modulator 180.

Figure 3C:
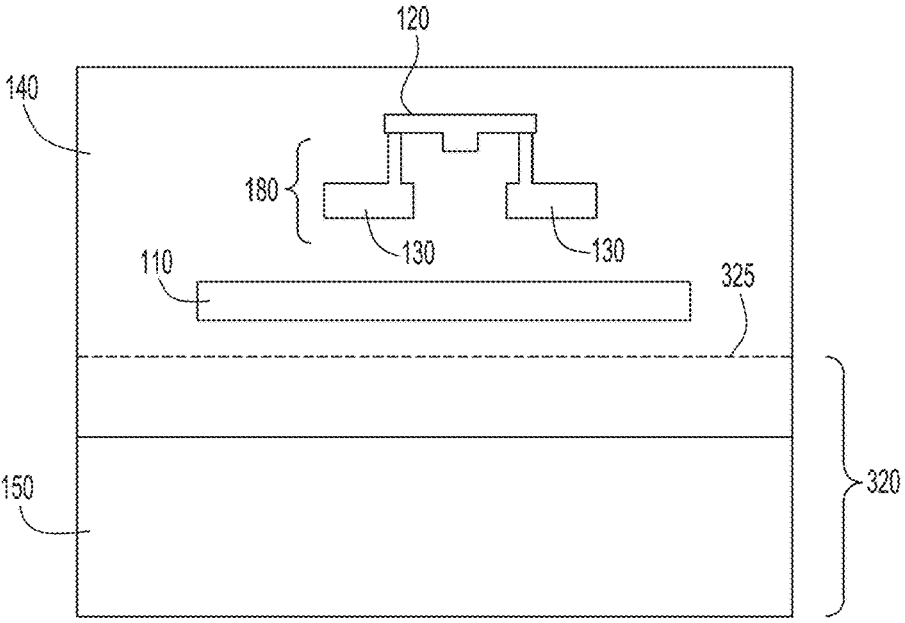

In FIG. 3C, inverted wafer 310 has been bonded to handle wafer 320 and the substrate 312 of wafer 310 has been removed. As illustrated in FIG. 3C, the dielectric 140 of inverted wafer 310 has been bonded with the dielectric 140 of handle wafer 320 at wafer bonding interface 325. Metal shield 110 is between the electrodes 130 of modulator 180 and substrate 150. Because the metal shield 110 was fabricated in wafer 310, metal shield 110 is above wafer bonding interface 325.

Figure 3D:
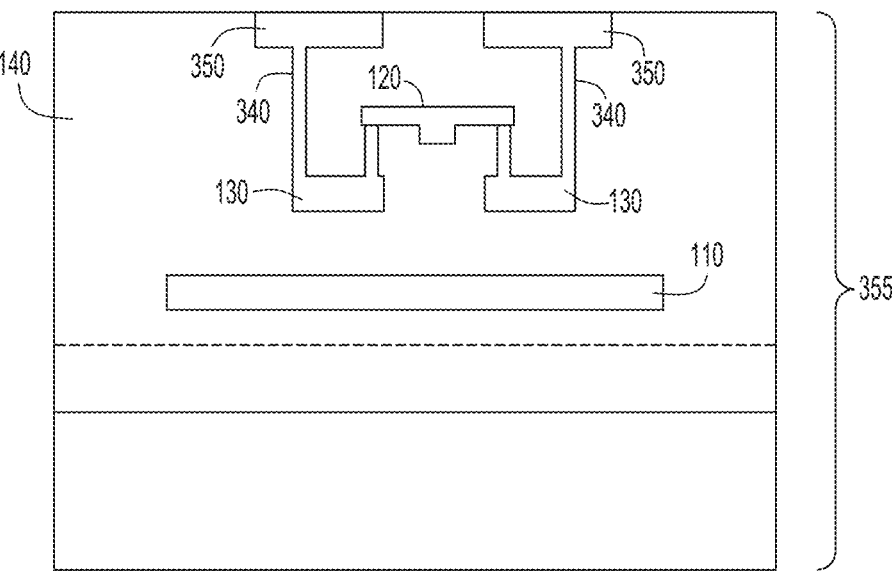

FIG. 3D illustrates an example of a semiconductor device 355 in which metal shield 110 is a floating shielding plane. In FIG. 3D, electrodes 130 are electrically connected to metals 350 with vias 340. In the example illustrated in FIG. 3D, metal shield 110 is floating or not connected to any metals or electrodes. Metal shield 110 blocks the electromagnetic field emanating from electrodes 130 from reaching substrate 150. In some embodiments, electrodes that provide the RF driving signals for modulator 180 may be one or more of electrodes 130 and/or metals 350.

Figure 3E:
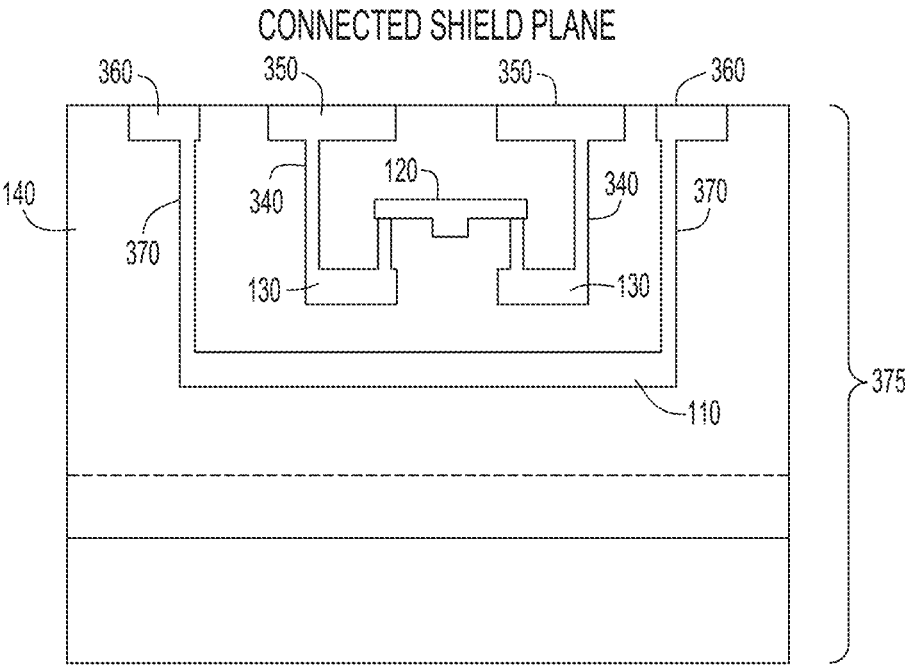

FIG. 3E is an example of a semiconductor device 375 in which the metal shield 110 is connected to metals or electrodes. As illustrated in FIG. 3E, electrodes 130 are electrically connected to metals 350 with vias 340. In addition, metal shield 110 is electrically coupled to metals/electrodes 360 with vias 370 to form a connected shielding plane. Metal shield 110 blocks the electromagnetic field emanating from electrodes 130 from reaching substrate 150. FIGS. 3D and 3E illustrate alternate embodiments of ways in which the metal shield 110 can be implemented in semiconductor devices.

Figure 4A:
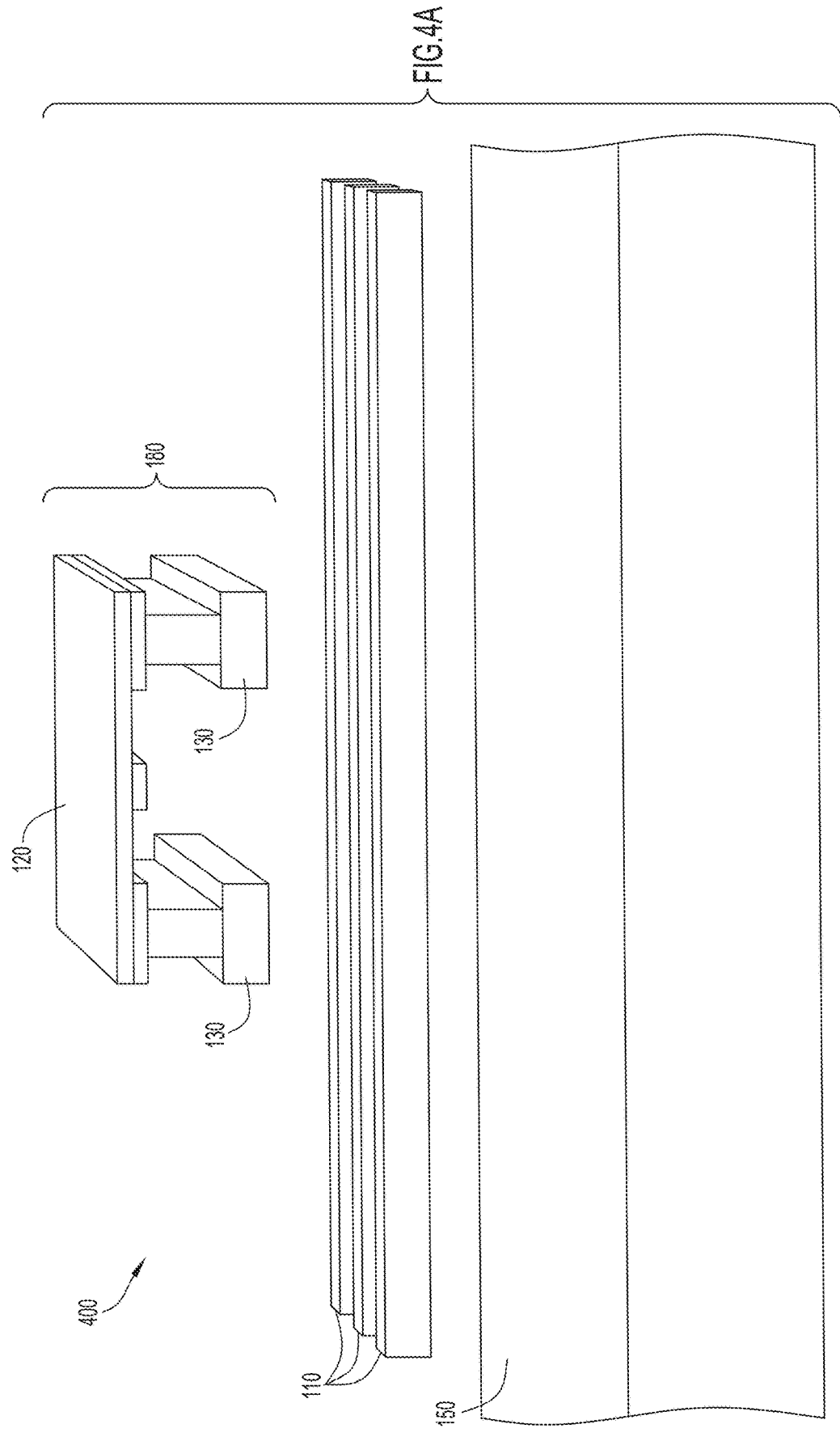
FIGS. 4A and 4B show an exemplary semiconductor device with a floating metal shield, according to an example embodiment.
Figure 4B:
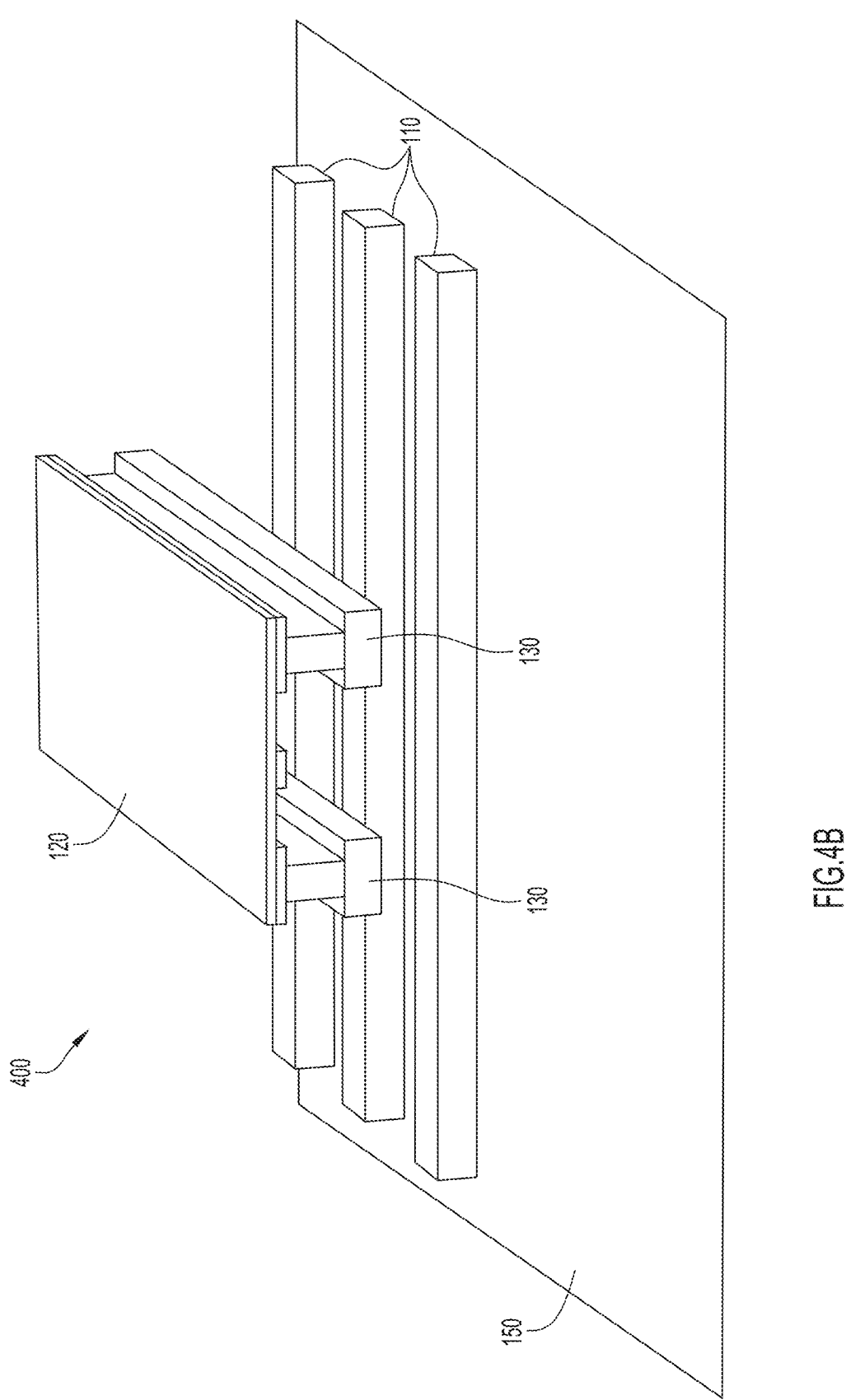

FIGS. 4A and 4B illustrate semiconductor devices with a floating metal shield. FIG. 4A illustrates a first view of semiconductor device 400 with metal shield 110 between modulator 180 and substrate 150. In the example illustrated in FIG. 4A, metal shield 110 consists of several isolated medal bars in parallel. Although the metal bars illustrated in FIG. 4A are isolated, in other embodiments, the metal bars may be connected (e.g., with transverse bars, as a solid metal layer, etc.) or otherwise patterned. As illustrated in FIG. 4A, the metal shield 110 is floating or not connected to any metals or electrodes. Metal shield 110 is separated from modulator 180 and substrate 150 and blocks an electromagnetic field emanating from modulator 180 from entering substrate 150. FIG. 4B illustrates another view of semiconductor device 400.

Figure 5A:
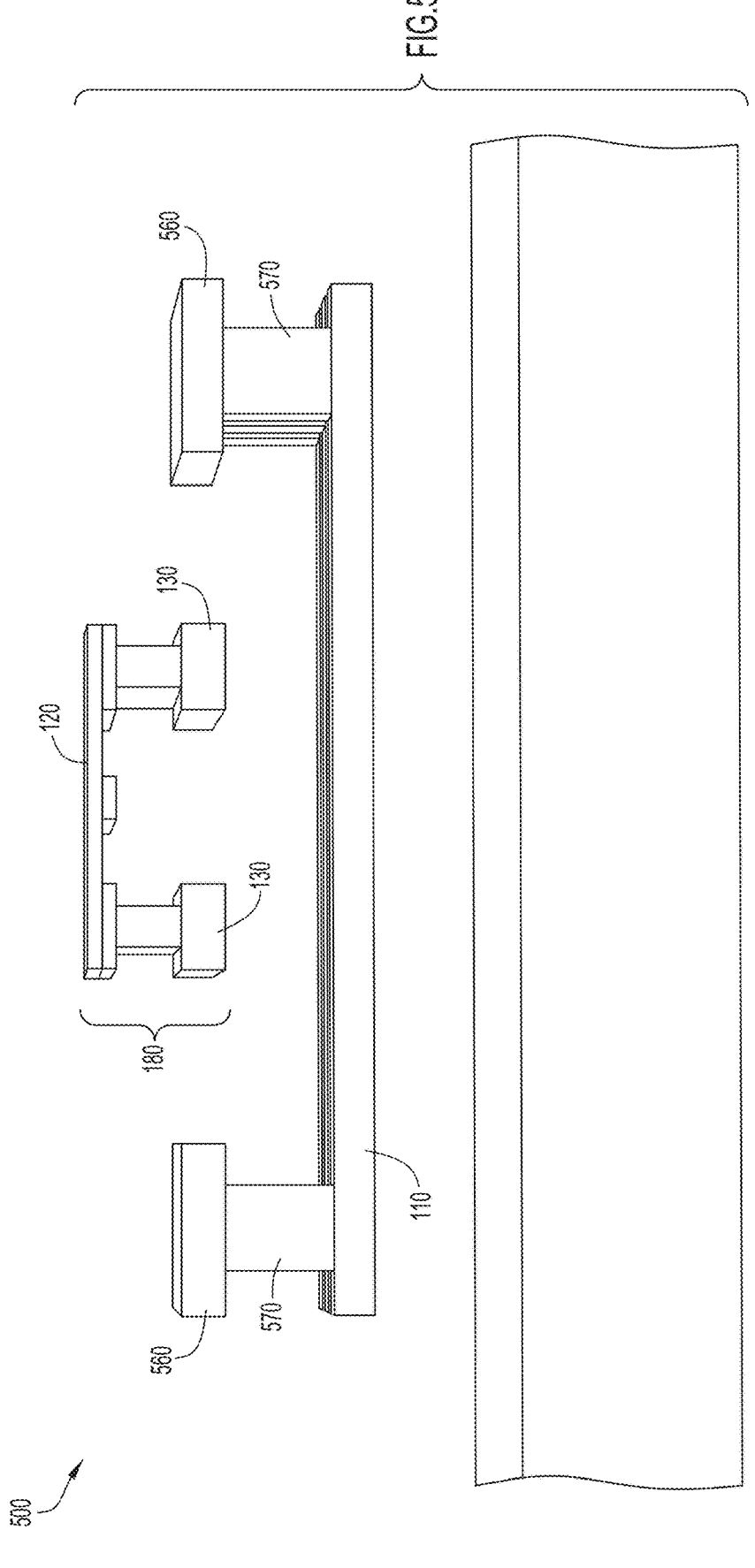
FIGS. 5A and 5B show an exemplary semiconductor device with a metal shield electrically coupled to electrodes, according to an example embodiment.
Figure 5B:
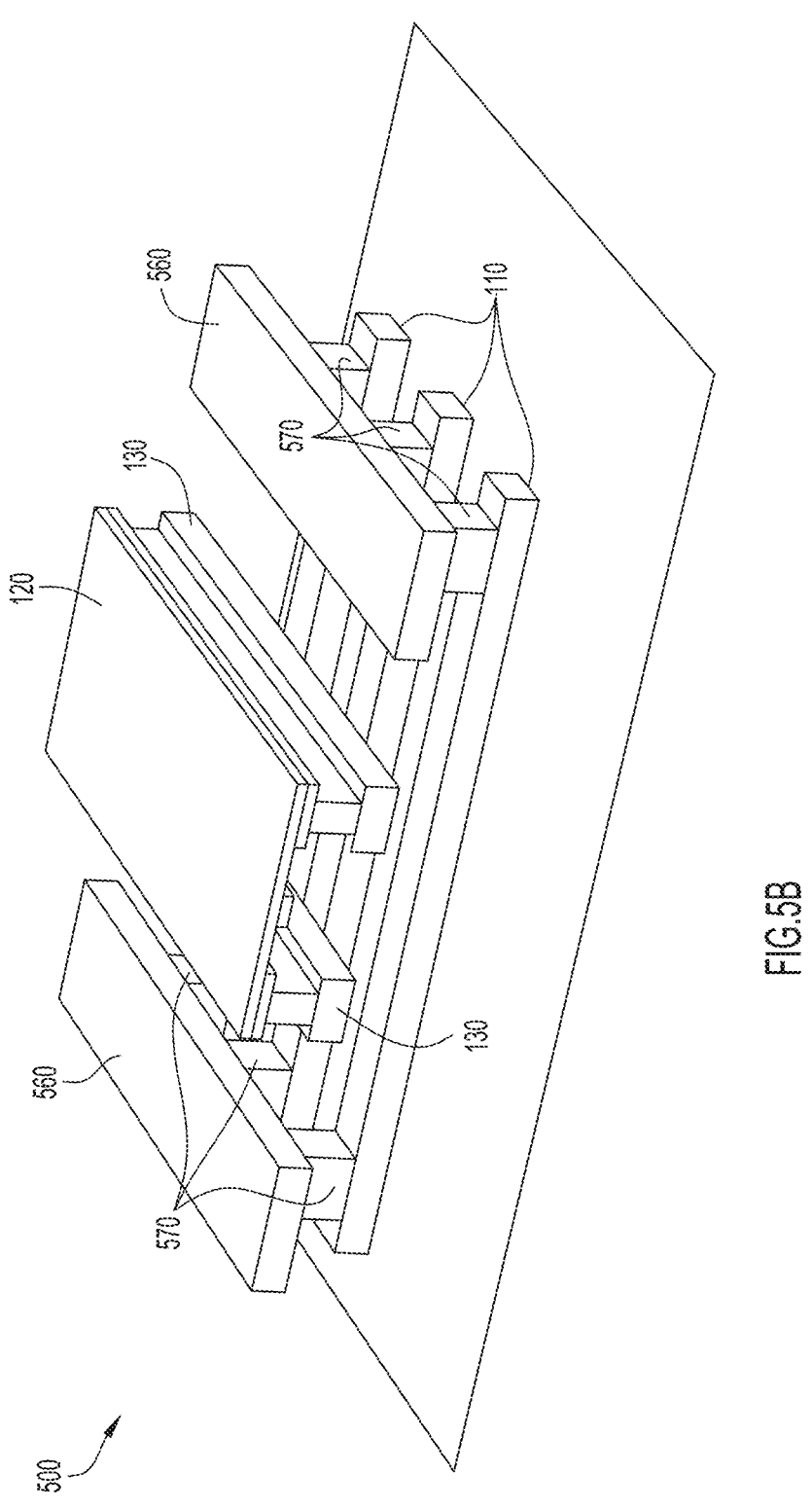

FIGS. 5A and 5B illustrate semiconductor devices with a metal shield connected to metals/electrodes. FIG. 5A illustrates a first view of semiconductor device 500 with metal shield 110 between modulator 180 and substrate 150. FIG. 5B illustrates another view of semiconductor device 500. In the example illustrated in FIGS. 5A and 5B, metal shield 110 consists of several isolated parallel medal bars. Although the metal bars illustrated in FIG. 4A are isolated, in other embodiments, the metal bars may be connected (e.g., with transverse bars, as a solid metal layer, etc.) or otherwise patterned. As illustrated in FIG. 5A, the metal shield 110 is electrically coupled to metals/electrodes 560 with vias 570. Metal shield 110 is separated from modulator 180 and substrate 150 and metal shield 110 blocks an electromagnetic field emanating from modulator 180 from entering substrate 150.

Figure 6A:
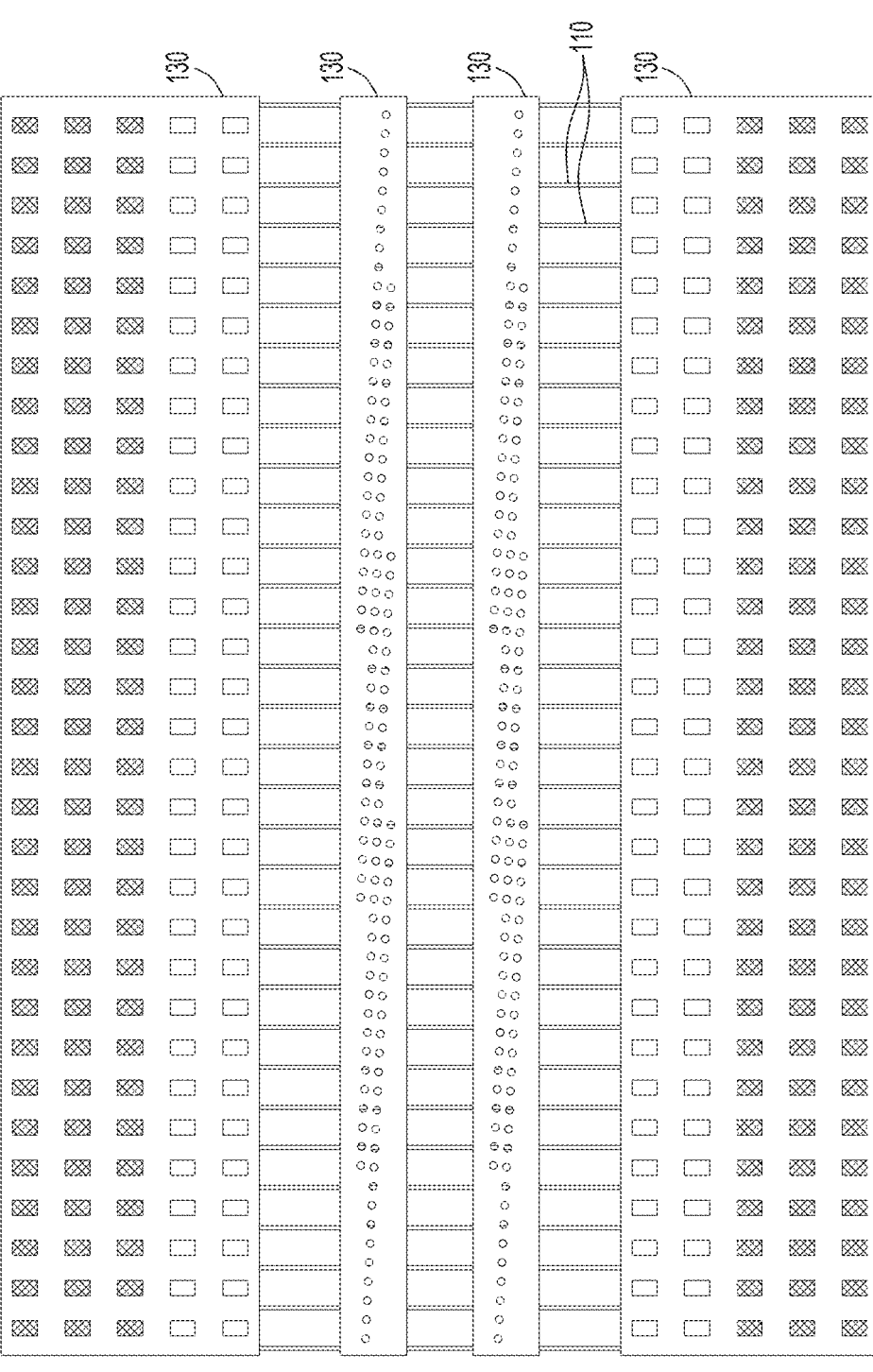
FIGS. 6A and 6B show an exemplary pattern of the metal shield, according to an example embodiment.
Figure 6B:
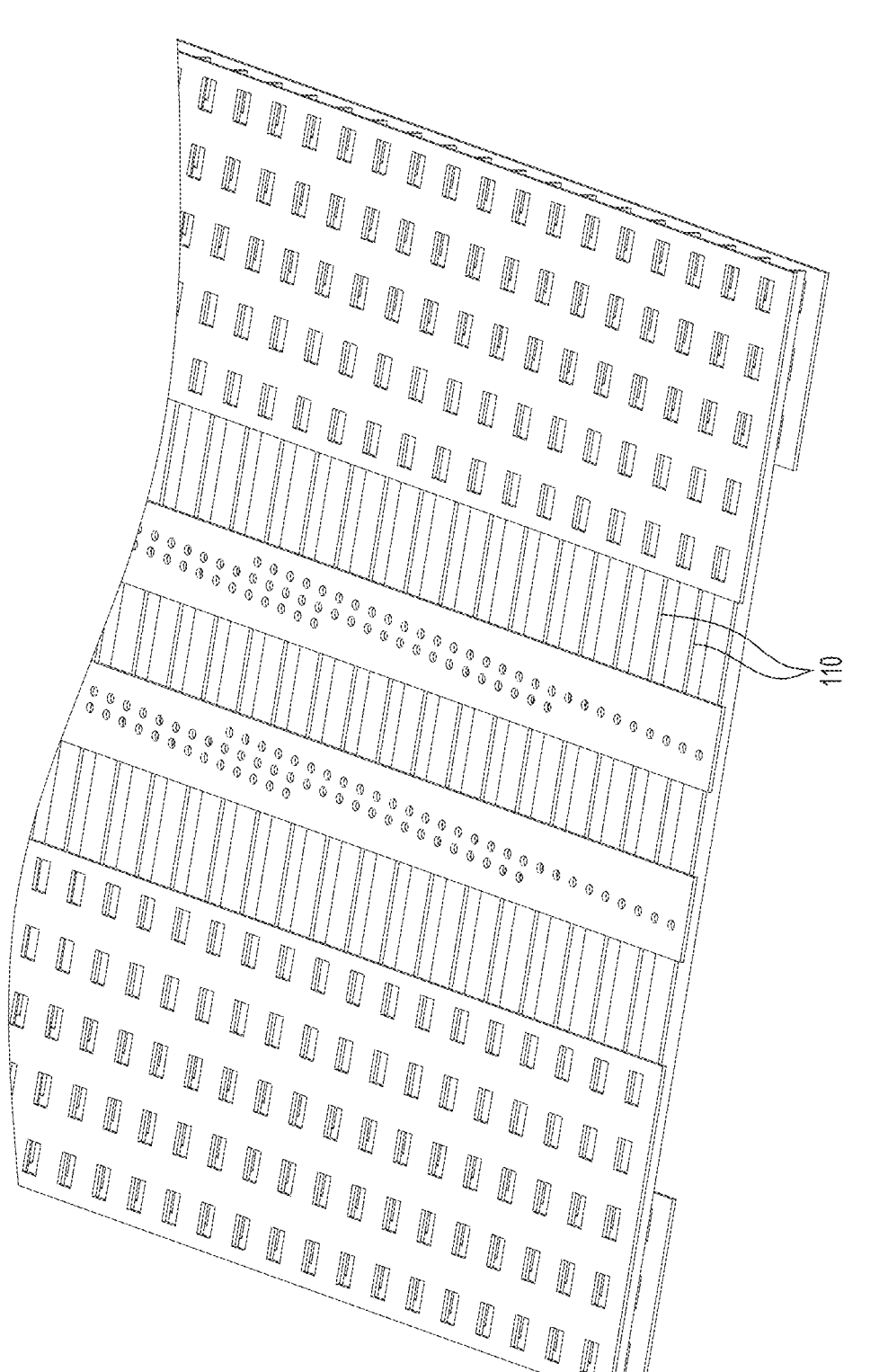

FIGS. 6A and 6B illustrate an example of a patterned metal shield 110 under electrodes 130. FIGS. 6A and 6B show a top view of electrodes 130 with metal shields 110 underneath. Although modulator waveguides/silicon modulators 120 are not shown in FIGS. 6A and 6B, silicon modulators 120 may be placed, for example, between two signal electrodes. In the example illustrated in FIGS. 6A and 6B, metal shield 110 is patterned as metal bars that are positioned between electrodes 130 and a silicon substrate. In this example, the shielding metal bars of metal shield 110 are vertically separated from the signal electrodes 130 and placed in the transverse direction of the electrode propagation direction with certain pitch. This allows another degree of freedom where the parasitic capacitance from the metal shield 110 can be used to optimize the modular characteristics (e.g., impedance, velocity, bandwidth).

FIG. 7 is a flow chart of a method 700 of fabricating a semiconductor device in which a metal shield is positioned between an optical modulator and a substrate to prevent an electromagnetic field from the optical modulator from reaching the substrate.

At 710, a first wafer is fabricated. The first wafer includes an optical modulator formed in a dielectric material. The first wafer additionally includes a silicon substrate. The optical modulator includes a silicon diode electrically coupled to a plurality of electrodes. At 720, a second wafer is fabricated. The second wafer includes a metal shield formed in the dielectric material on top of a silicon substrate. At 730, the first wafer is inverted to form an inverted first wafer. The inverted first wafer is upside down such that elements of the optical modulator are in an upside position with respect to a position of the elements when the elements were fabricated/formed.

At 740, the inverted first wafer is bonded to the second wafer such that the metal shield is positioned between the plurality of electrodes of the optical modulator and the silicon substrate. The silicon substrate of the first wafer is removed. The dielectric material of the inverted first wafer is bonded to the dielectric material of the second wafer at a wafer bonding interface. The metal shield is below the wafer bonding interface. When the inverted first wafer is bonded to the second wafer, the metal shield prevents the electromagnetic field caused by RF signals propagating along the electrodes from extending into the substrate.

FIG. 8 is a flow chart of another method 800 of fabricating a semiconductor device in which a metal shield is positioned between an optical modulator and a substrate to prevent an electromagnetic field emanating from the optical modulator from reaching the substrate. At 810, a first wafer is fabricated. The first wafer includes a metal shield fabricated above an optical modulator. The metal shield and the optical modulator are formed in a dielectric material. The first wafer additionally includes a silicon substrate. At 820, a second wafer is fabricated. The second wafer includes a layer of the dielectric material fabricated on top of a silicon substrate.

At 830, the first wafer is inverted to form an inverted first wafer in which the optical modulator is above the metal shield. In other words, the first wafer is turned upside down so that the metal shield that was fabricated above the optical modular is below the optical modular in the inverted first wafer. In the inverted first wafer, a layer of dielectric material is below the metal shield.

At 840, the inverted first wafer is bonded to the second wafer such that the metal shield is positioned between the optical modulator and the silicon substrate. The silicon substrate of the first wafer is removed. The dielectric material of the inverted first wafer is bonded to the dielectric material of the second wafer at a wafer bonding interface. The metal shield is above the wafer bonding interface. When the inverted first wafer is bonded to the second wafer, the metal shield prevents the electromagnetic field caused by RF signals propagating along the electrodes from extending into the substrate.

In one form, a device is provided including: an optical modulator formed in a dielectric material; a silicon substrate adjacent the dielectric material; and a metal shield formed in the dielectric material between the optical modulator and the silicon substrate, the metal shield blocking an electromagnetic field of a driving signal of the optical modulator from extending into the silicon substrate.

In one example, the metal shield is a floating metal shield that is not connected to an electrode. In another example, the metal shield is electrically connected to one or more electrodes. In another example, the metal shield is a solid metal block. In another example, the metal shield includes a plurality of metal bars positioned in a transverse direction of the driving signal. In another example, each of the plurality of metal bars is isolated and not connected to other metal bars of the plurality of metal bars. In another example, the device is fabricated by bonding a first wafer to an inverted second wafer, the inverted second wafer including the optical modulator and the metal shield. In another example, the device is fabricated by bonding a first wafer to an inverted second wafer, the first wafer including the metal shield and the inverted second wafer including the optical modulator.

In another form, a method is provided including: fabricating a first wafer, the first wafer including an optical modulator formed in a dielectric material, the optical modulator including a silicon diode electrically coupled to a plurality of electrodes; fabricating a second wafer, the second wafer including a metal shield formed in the dielectric material on top of a silicon substrate; inverting the first wafer to form an inverted first wafer; and bonding the inverted first wafer to the second wafer such that the metal shield is positioned between the plurality of electrodes of the optical modulator and the silicon substrate.

In one example, the method further includes electrically coupling the metal shield to a second plurality of electrodes. In another example, the metal shield is a floating metal shield. In another example, the metal shield is a solid metal block. In another example, the metal shield is patterned to include a plurality of metal bars. In another example, the silicon substrate is a low resistivity silicon substrate.

In yet another form, a method is provided including: fabricating a first wafer, the first wafer including a metal shield fabricated above an optical modulator, the metal shield and the optical modulator being formed in a dielectric material; fabricating a second wafer, the second wafer including a layer of the dielectric material fabricated on top of a silicon substrate; inverting the first wafer to form an inverted first wafer in which the optical modulator is above the metal shield; and bonding the inverted first wafer to the second wafer such that the metal shield is positioned between the optical modulator and the silicon substrate.

VARIATIONS AND IMPLEMENTATIONS

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
fabricating a first wafer, the first wafer including an optical modulator formed in a dielectric material, the optical modulator including a silicon diode electrically coupled to a plurality of electrodes;
fabricating a second wafer, the second wafer including a metal shield formed in the dielectric material on top of a silicon substrate, wherein the metal shield is a floating metal shield that includes a plurality of metal bars placed in a transverse direction of an electrode propagation direction of the optical modulator with a certain pitch;
inverting the first wafer to form an inverted first wafer; and
bonding the inverted first wafer to the second wafer such that the metal shield is positioned between the plurality of electrodes of the optical modulator and the silicon substrate.

2. The method of claim 1, wherein the metal shield is patterned to include the plurality of metal bars.

3. The method of claim 1, wherein the silicon substrate is a low resistivity silicon substrate.

4. The method of claim 1, wherein the floating metal shield is not connected to an electrode.

5. The method of claim 1, wherein each of the plurality of metal bars is isolated and not connected to other metal bars of the plurality of metal bars.

6. The method of claim 1, wherein the floating metal shield is positioned between the plurality of electrodes and the silicon substrate.

7. The method of claim 1, wherein the metal shield blocks an electromagnetic field emanating from the optical modulator from entering the silicon substrate.

8. The method of claim 1, wherein the plurality of metal bars of the metal shield are vertically separated from the plurality of electrodes.

9. The method of claim 1, wherein bonding the inverted first wafer to the second wafer includes bonding a first layer of the dielectric material of the first wafer to a second layer of the dielectric material of the second wafer.

10. The method of claim 1, wherein the plurality of metal bars are parallel to one another.

11. A method comprising:
providing an optical modulator in a first layer of dielectric material;
providing a silicon substrate adjacent the first layer of dielectric material; and
providing a floating metal shield in a second layer of dielectric material between the optical modulator and the silicon substrate, the floating metal shield blocking an electromagnetic field of a driving signal of the optical modulator from extending into the silicon substrate, the floating metal shield including a plurality of metal bars positioned in a transverse direction of the driving signal with a certain pitch.

12. The method of claim 11, wherein the floating metal shield is not connected to an electrode.

13. The method of claim 11, wherein each of the plurality of metal bars is isolated and not connected to other metal bars of the plurality of metal bars.

14. The method of claim 11, wherein providing the floating metal shield in the second layer of dielectric material between the optical modulator and the silicon substrate further comprises:
bonding a first wafer to an inverted second wafer, the first wafer including the floating metal shield and the inverted second wafer including the optical modulator.

15. The method of claim 11, wherein the silicon substrate is a low resistivity silicon substrate.

16. The method of claim 11, wherein the floating metal shield is patterned to include the plurality of metal bars.

17. The method of claim 11, wherein the optical modulator includes a silicon diode electrically coupled to a plurality of electrodes, and wherein the floating metal shield is positioned between the plurality of electrodes and the silicon substrate.

18. The method of claim 11, wherein the floating metal shield blocks an electromagnetic field emanating from the optical modulator from entering the silicon substrate.

19. The method of claim 11, wherein the optical modulator includes a silicon diode electrically coupled to a plurality of electrodes, and wherein the plurality of metal bars of the floating metal shield are vertically separated from the plurality of electrodes.

20. The method of claim 11, wherein the plurality of metal bars are parallel to one another.

* * * * *